Patented May 6, 1941

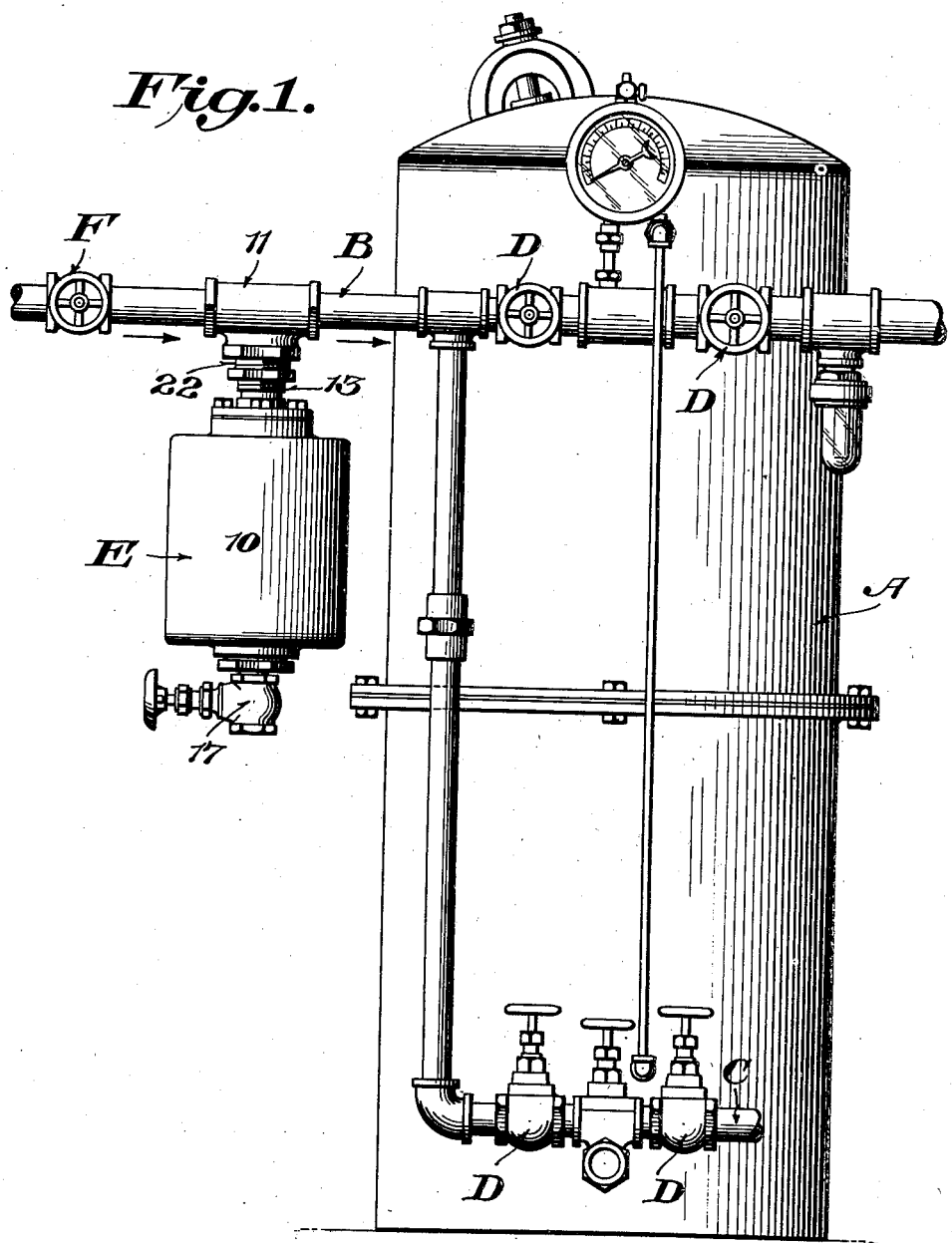

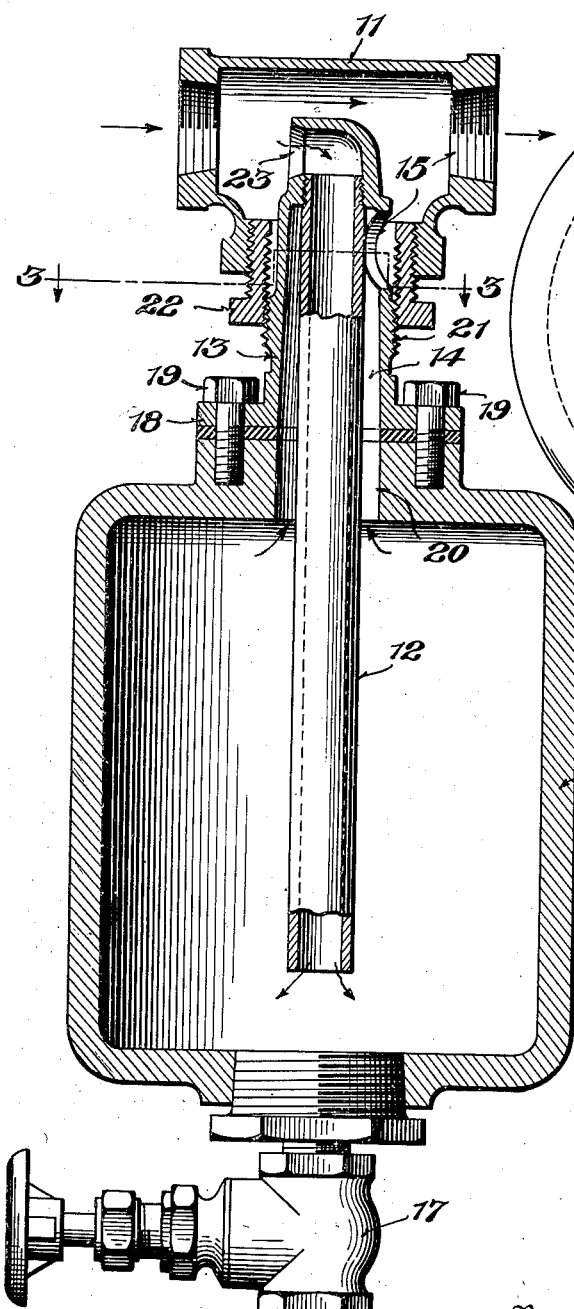
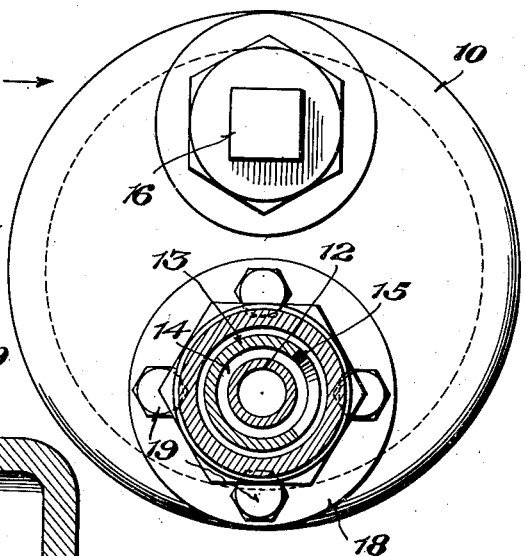
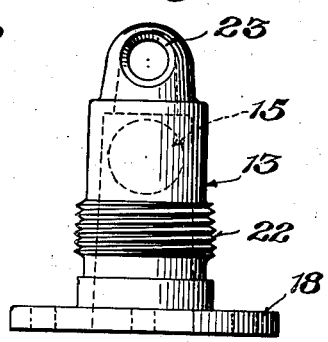

2,240,648

UNITED STATES PATENT OFFICE 2,240,648

STERILIZING UNIT FOR WATER FILTERS

Harry Buxton Hartman, Florence, Mass., assignor to Norwood Filtration Company, Florence, Mass., a corporation of Massachusetts.

Application May 1, 1939, Serial No. 271,139

3 Claims. (Cl. 210—38)

This invention relates to means for use in sterilizing water filters, and has generally in view to provide a simple, practical means whereby water filters may be sterilized expeditiously and efficiently.

Heretofore the usual method of sterilizing a water filter has comprised simply feeding to the top or water inlet end of the filter a chlorine or other sterilizing solution to be carried through the filter by the water. At least, this method is inefficient, although satisfactory sterilization may result if sufficient of the sterilizing solution is fed to the filter over a sufficiently long period of time and if the filtering materials of the filter are of a nature such as not to eliminate or neutralize the sterilizing agent. If, however, the filtering materials of the filter nearer the top or inlet end thereof are of a nature to eliminate or neutralize the sterilizing agent, said method is totally inefficient, even if the filter is previously backwashed, as the sterilizing agent becomes substantially eliminated or neutralized by the time it has reached the lower or outlet end of the filter where foreign matter is concentrated and where sterilization primarily is required. Heretofore it has not been practicable to feed a sterilizing solution to the lower or outlet end of an ordinary water filter. Consequently, even though it has long been known to backwash filters, it has not heretofore been practicable efficiently to sterilize a filter by backwashing same and feeding a sterilizing solution thereto with the backwashing water.

Accordingly one special object of the present invention is to provide a unit to be connected with a pipe through which filter backwashing water flows, and embodying a construction whereby a sterilizing solution contained therein is picked up by and carried along with backwashing water flowing through said pipe, to the end that the solution may be introduced into the lower or outlet end of the filter to be carried therethrough by the backwashing water to thus efficiently perform its function.

Another special object of the invention is to provide a simple, practical unit of the character mentioned which may readily be installed in a filtration system, which includes a vessel to be supplied with a sterilizing solution, and which embodies a novel construction whereby the amount of the solution that is picked up by and carried along with the backwashing water is proportioned to the amount of backwashing water that is delivered to the filter.

With the foregoing and other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the accompanying drawings, wherein like characters of reference denote corresponding parts in the different views:

Figure 1 is an elevation of a water filter and its pipe connections, illustrating a supply unit for a sterilizing solution operatively associated therewith.

Figure 2 is an enlarged vertical section through the supply unit.

Figure 3 is a horizontal section on the line 3—3 of Fig. 2; and

Figure 4 is an elevation of a part of the supply unit removed from the unit.

Referring to the drawings in detail, A designates, generally, a water filter which may be of any known type; B designates a supply pipe for the water to be filtered connected with both the top and bottom or inlet and outlet ends of said filter; C designates an outlet pipe leading from the bottom or outlet end of the filter A; D designates valves suitably arranged in said pipes for manipulation either to cut out the filter from the system, or to direct the water downwardly through the filter for filtration by the latter, or upwardly or reversely through the filter for filter backwashing purposes; E designates, generally, the present unit connected with the pipe B for supplying to water flowing through said pipe a sterilizing solution, and F designates a valve in the pipe B in advance of the unit E for cutting off the water supply at selected times.

The unit E comprises, generally speaking, a vessel 10 to contain a sterilizing solution; a T-fitting 11 carried by said vessel at its upper end to be interposed in the water supply pipe B and to constitute part of said pipe; an open-ended tube 12 having its upper end disposed within the T-fitting 11 and facing the inlet end thereof and its lower end disposed in the vessel 10 near the bottom thereof; and a nozzle-unit or neck 13 cooperating with said tube 12 to prevent flow of water from the pipe B into the vessel 10 except through said tube and providing in surrounding relationship to said tube, a passageway 14 communicating at its lower end with the vessel 10 and in communication at its upper end with the T-fitting 11 through an opening 15 in the unit 13 facing the outlet end of said T-fitting.

In the top of the vessel 10 is a filling opening which normally is closed by a plug 16, while in the bottom of said vessel is a drain opening which normally is closed by a plug or by a drain valve designated as 17.

When water is flowing through the supply pipe B there is a circulation of water from said pipe to the vessel 10 through the tube 12 and from said vessel to said pipe through the passageway 14 and the opening 15, due to some of the water being directed into the tube 12 by virtue of the upper unit 13 said tube facing the inlet end of the T-fitting 11 and also by virtue of the injector action which results from the opening 15 facing the outlet end of said T-fitting 11.

The amount of water which circulates through the vessel 10 depends, of course, not only upon the size of the tube 12 and the opening 15, but also upon the velocity of water flowing through the pipe B, for reasons which are obvious.

Normally the vessel 10 does not contain a sterilizing solution and it is immaterial whether water does or does not circulate through said vessel. When, however, the vessel 10 does contain a sterilizing solution, it is manifest that said solution will be picked up by the water circulating through said vessel and will be carried by the water to the filter A.

Normally, the status of the valves D is such that the water circulates downwardly through the filter A. If, under such conditions, the vessel 10 contained a sterilizing solution, the solution would be carried by the water to the top of the filter 10 and sterilization of the filter would be effected, if at all, in accordance with prior practice, except that the sterilizing solution, instead of being fed directly into the top of the filter, would more advantageously, be fed to the water prior to the same reaching the filter. If, on the other hand, the sterilizing solution is fed to the water only after the direction of flow of the water through the filter A is reversed so as to have a backwashing action on the filtering materials, efficient sterilization will result.

Accordingly, prior to introducing the sterilizing solution into the vessel 10, the valves D are manipulated to cause the water to flow in a reverse or backwashing direction through the filter A, the unit E affording, as is apparent, a practical means of introducing the sterilizing solution into the reversely flowing or backwashing water. In this connection, in order to introduce the sterilizing solution into the vessel 10, the valve F temporarily is closed to cut off the water supply and enough water is drained from the vessel 10 to permit the desired amount of sterilizing solution to be introduced into said vessel 10. Thereafter the valves D, if they have not previously been manipulated to cause a reverse or backwashing flow of the water, are manipulated to cause such flow of the water and the valve F then is opened. The water then flows in reverse or backwashing direction through the filter and carries with it the solution that is picked up by the water which circulates through the vessel 10.

If desired, after sufficient time has elapsed for all or the required amount of the sterilizing solution to pass through or into the filter A, the valves D may be manipulated to immediately restore the normal direction of flow of the water, or the valve F may be closed to cut off the water supply to permit the sterilizing solution to remain in the filter over any desired period of time.

Obviously, the unit E may have a variety of specifically different constructions of which the construction shown in the drawings is simply one example. However, the construction shown is highly practicable because it permits the unit to be economically constructed in part from standard pipe fittings and because it requires, aside from the vessel 10, the production of only one special part. In other words, aside from the vessel 10, the only specially constructed part of the unit E illustrated in the drawings is the part comprising the unit 13. This nozzle-unit 13 is hollow, open at its bottom and provided at its bottom with a flange 18 to permit it to be secured by machine screws 19 or in any other suitable manner upon the top of its vessel 10 with its open bottom alined with an opening 20 in the top of the vessel 10. Thus, when said unit 13 is fastened upon the top of the vessel 10, the interior thereof is in constant communication with the vessel 10.

Intermediate its ends the nozzle or neck part 13 is exteriorly threaded as indicated at 21 to have screwed thereon a bushing 22, and above said threads 21 said neck part is of smaller exterior diameter than the interior diameter of the bushing 22 to afford a space through which water may flow. Near its top, said neck part is of reduced internal diameter and is internally threaded to receive the upper end of the tube 12, while at its top said neck part is completely closed except for a side inlet opening 23 which forms, in effect, the top part of the tube 12.

Threaded upon the bushing 22 is the T-fitting 11 toward the inlet end of which the opening 23 in the neck part 13 faces, while in the neck part 13 below its smaller diameter portion into which the top of the tube 12 is threaded, is the opening 15 which faces toward the outlet end of the T-fitting and which is in communication with said T-fitting through the space between the upper portion of the neck part 13 and the bushing 22. The passageway 14 is comprised, of course, by the portion of the hollow interior of the neck part 13 and the portion of the opening 20 surrounding the tube 12, and said passageway and, consequently, the vessel 10 are in communication with the T-fitting 11 through the opening 15.

Obviously, the greater the velocity of the water flowing through the T-fitting 11 the greater the amount of the water that will be circulated through the vessel 10 and the greater the amount of sterilizing solution that will be picked up by the water and carried to the filter, and vice-versa. Accordingly, the sterilizing solution is advantageously fed to the filter proportionately to the amount of water that passes therethrough. Moreover, and of distinct importance, is the fact that the unit E affords a practical means whereby a sterilizing solution may be fed to a filter in a direction counter to the normal direction of flow of water therethrough by backwashing water.

Without further description it is thought that the features and advantages of the invention will be readily apparent to those skilled in the art, and it will, of course, be understood that changes in the form, proportion and minor details of construction may be resorted to, without departing from the spirit of the invention and scope of the appended claims.

I claim:

1. A unit to be supplied with a solution and to be interposed in a water pipe and to have water circulated therethrough from and to said pipe for the purpose of supplying the water with the solution, said unit comprising a vessel to contain the solution, a fitting to be interposed in said pipe, said fitting being open from end to end for flow of water directly therethrough, a hollow neck extending upwardly from said vessel into said fitting and exteriorly connected with said fitting so that water cannot escape from the fitting therearound, said neck having in its upper end an opening through which some of the water entering said fitting may flow, a tube joined at its upper end with the upper end portion of said neck and in communication with said opening and extending downwardly through said neck into said vessel and having an open lower end so that water entering said opening is conducted into said vessel, said tube being spaced from said neck to provide an annular passageway between the same and said neck, said passageway being closed at its upper end with respect to the water inlet opennig in the upper end of said neck, said neck having a side opening facing the water outlet end of said fitting and affording communication between said passageway and said fitting, said passageway also being closed with respect to said fitting except through said side opening, whereby water flowing through said fitting induces a circulation of water from said fitting through said tube to said vessel and from said vessel through said passageway and the side opening in said neck back to said fitting.

2. A unit to be supplied with a solution and to be interposed in a water pipe and to have water circulated therethrough from and to said pipe for the purpose of supplying the water with the solution, said unit comprising a vessel to contain the solution, a T-fitting to be interposed in said pipe with the stem of the fitting extending downwardly, said fitting being open from end to end for flow of water directly therethrough, a hollow neck extending upwardly from said vessel into the stem of said fitting and exteriorly connected with said stem so that water cannot escape from the fitting therearound, said neck having in its upper end an opening through which some of the water entering said fitting may flow, a tube joined at its upper end with the upper end portion of said neck and in communication with said opening and extending downwardly through said neck into said vessel and having an open lower end so that water entering said opening is conducted into said vessel, said tube being spaced from said neck to provide an annular passageway between the same and said neck, said passageway being closed at its upper end with respect to the water inlet opening in the upper end of said neck, said neck having a side opening facing the water outlet end of said fitting and affording communication between said passageway and said fitting, said passageway also being closed with respect to said fitting except through said side opening, whereby water flowing through said fitting induces a circulation of water from said fitting through said tube to said vessel and from said vessel through said passageway and the side opening in said neck back to said fitting.

3. A unit to be supplied with a solution and to be interposed in a water pipe and to have water circulated therethrough from and to said pipe for the purpose of supplying the water with the solution, said unit comprising a vessel to contain the solution, a T-fitting to be interposed in said pipe with the stem of the fitting extending downwardly, said fitting being open from end to end for flow of water directly therethrough, a bushing threaded into the depending stem of said fitting, a hollow neck extending upwardly from said vessel and exteriorly threaded into said bushing, said neck having in its upper end an opening through which some of the water entering said fitting may flow, a tube joined at its upper end with the upper end portion of said neck and in communication with said opening and extending downwardly through said neck into said vessel and having an open lower end so that water entering said opening is conducted into said vessel, said tube being spaced from said neck to provide an annular passageway between the same and said neck, said passageway being closed at its upper end with respect to the water inlet opening in the upper end of said neck, said neck within that portion of its length which is disposed within the upper end portion of said bushing being of lesser external diameter than the internal diameter of said bushing and having a side opening facing the water outlet end of said fitting and affording communication between said passageway and said fitting, said passageway also being closed with respect to said fitting except through said side opening, whereby water flowing through said fitting induces a circulation of water from said fitting through said tube to said vessel and from said vessel through said passageway and the side opening in said neck back to said fitting.

HARRY BUXTON HARTMAN.